(12) United States Patent
Wu

(10) Patent No.: US 8,331,973 B2
(45) Date of Patent: Dec. 11, 2012

(54) METHOD AND SYSTEM FOR TERMINAL PTT REGISTRATION BASED ON CDMA TRUNKING SYSTEM

(75) Inventor: Chuanxi Wu, Guangdong (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 268 days.

(21) Appl. No.: 12/671,507

(22) PCT Filed: Jul. 31, 2008

(86) PCT No.: PCT/CN2008/071835
§ 371 (c)(1),
(2), (4) Date: Jan. 30, 2010

(87) PCT Pub. No.: WO2009/015610
PCT Pub. Date: Feb. 5, 2009

(65) Prior Publication Data
US 2010/0216503 A1 Aug. 26, 2010

(30) Foreign Application Priority Data
Jul. 31, 2007 (CN) .......................... 2007 1 0137657

(51) Int. Cl.
*H04B 7/00* (2006.01)
(52) U.S. Cl. ........ 455/520; 455/90.2; 455/518; 455/519
(58) Field of Classification Search .......... 455/517–520, 455/553.1, 90.2, 78, 79, 500, 426.1, 412.1, 455/414.1, 416, 420, 435.1
See application file for complete search history.

(56) References Cited

U.S. PATENT DOCUMENTS

| | | | |
|---|---|---|---|
| 6,876,670 B1 * | 4/2005 | Budrikis et al. ............. | 370/474 |
| 7,289,816 B2 * | 10/2007 | Mills .............................. | 455/458 |
| 7,366,131 B2 * | 4/2008 | Park ............................... | 370/328 |
| 7,477,911 B1 * | 1/2009 | Praveen et al. ................ | 455/518 |
| 7,822,437 B2 * | 10/2010 | Barrow et al. ............. | 455/552.1 |
| 8,077,634 B2 * | 12/2011 | Maggenti et al. ............. | 370/260 |
| 2004/0090950 A1 * | 5/2004 | Lauber et al. .................. | 370/352 |
| 2005/0202819 A1 * | 9/2005 | Blicker ....................... | 455/435.1 |
| 2006/0114882 A1 * | 6/2006 | Mills ............................. | 370/352 |
| 2006/0270362 A1 * | 11/2006 | Emrich et al. ............... | 455/90.2 |
| 2007/0153719 A1 * | 7/2007 | Gopal ............................ | 370/328 |
| 2007/0238466 A1 * | 10/2007 | Buckley et al. ............... | 455/445 |

FOREIGN PATENT DOCUMENTS

| | | |
|---|---|---|
| CN | 1585554 A | 2/2005 |
| CN | 1717076 A | 1/2006 |
| CN | 101137231 A | 3/2008 |
| KR | 20050107205 A | 11/2005 |

OTHER PUBLICATIONS

P.R. China, State Intellectual Property Office, International Search Report for International Application No. PCT/CN2008/071835 mailed Nov. 13, 2008.

* cited by examiner

*Primary Examiner* — Dominic E Rego
(74) *Attorney, Agent, or Firm* — Bright IP Law Offices

(57) ABSTRACT

The present invention provides a method of terminal PTT registration based on CDMA trunking system and the system thereof, comprising: a user terminal is powered and a normal CDMA registration flow is completed, and afterwards the value of a PTT registration message counter is initialized; the user terminal sends a PTT registration message to a dispatching sub-system (server) and starts a PTT registration timer; and a corresponding process is performed according to the response message from the dispatching server, which is the reception of the trunking registration or the rejection of the trunking registration. Therefore the terminal with CDMA trunking function can avoid the problem caused by a failed PTT registration.

19 Claims, 10 Drawing Sheets

METHOD AND SYSTEM FOR TERMINAL PTT REGISTRATION BASED ON CDMA TRUNKING SYSTEM

FIELD OF THE INVENTION

The present invention relates to a method and system for terminal PTT (push to talk) registration based on CDMA trunking system.

BACKGROUND OF THE INVENTION

With the further development of mobile terminal device, there are a wide range of universal terminal equipments available in the market, such as a GSM terminal, a CDMA terminal, a WCDMA terminal, and a dual-mode and multi-standby terminal. At the same time, some trunking systems and terminals thereof directed to particular users have been developed and applied quickly, for example, a CDMA-based trunking system, gota. The trunking-based terminal equipment is important in the mobile terminal market. Generally, a trunking terminal is directed to users in a specific field, such as dockworkers, taxi drivers, traffic police, etc. However, the existing trunking system and the terminal thereof have some problems in certain aspects, for instance, a registration problem is widely existed in a current terminal of trunking function based on CDMA wherein if a incoming call is received before the PTT terminal registration, the trunking terminal can not carry out the registration or the registration is abnormal, thus resulting in terminal malfunctions.

SUMMERY OF THE INVENTION

The present invention is made by keeping the above problems in mind, thus the main object of the present invention is to provide a method and system for terminal PTT registration based on CDMA trunking system.

According to one aspect of the present invention, it is provided a method for terminal PTT registration based on CDMA trunking system, comprising:

Step S102, after a PTT terminal is powered and a normal CDMA registration flow is completed, the value of PTT registration message counter of the PTT terminal is initialized;

Step S104, the PTT terminal initiates a registration to the dispatching server and sends a registration message to a base station on a control channel through the PTT registration message;

Step S106, after having sent the PTT registration message, the PTT terminal starts a PTT registration timer of the terminal and waits for a registration response message from the base station;

Step S108, upon having received the PTT registration message of the PTT terminal user, the base station sends to the terminal a registration response message containing answer information;

Step S110, if the registration response message received by the PTT terminal is a PTT registration acceptance message from the base station, then turning to Step S114; if the registration response message received by the PTT terminal is a PTT registration refusal message from the base station, then turning to Step S118; if when the PTT registration timer has expired and the PTT terminal has not received a response message from the base station, then turning to S112;

Step S112, the value of PTT registration message counter is assigned with the value which is obtained by subtracting 1 from the current value of the registration message counter wherein if the value of PTT registration message counter is greater than 0, then the PTT terminal goes to Step S104 and re-sends a registration message to the base station, otherwise turning to Step S116;

Step S114, the registration succeeds and the PTT terminal shuts down the PTT registration timer, finishing the registration;

Step S116, the registration does not succeeds, the PTT registration timer is shut down, and the registration flow is finished;

Step S118, the registration is failed and the PTT registration timer is shut down, and the registration flow is finished.

In addition, the present method further comprises a timing registration timer, and after Step S116 comprises a process of starting the timing registration, wherein the registration process comprises:

Step S202, the time length of the timing registration timer is set as M and the timing registration timer is started wherein when the timing registration timer expires, turning to Step S204;

Step S204, the PTT terminal initiates a registration to the dispatching server wherein the terminal sends a registration message to the base station on the control channel through a PTT registration message, and the base station initiates a registration to the dispatching server;

Step S206, after sending the registration message, the PTT terminal starts the registration timer and waits for a response message from the base station;

Step S208, after receiving the registration response message from the PTT terminal, the base station sends to the PTT terminal a PTT registration message containing answer information;

Step S210, if the PTT terminal receives a registration acceptance message from the base station, then it shuts down the registration timer, turning to Step S212; if the PTT terminal receives a registration refusal message from the base station, then it shuts down the registration timer, turning to Step S214; if the PTT terminal has not received a response message from the base station when the registration timer expires, turning to Step S202;

Step S212, the registration succeeds and the PTT terminal shuts down the timing registration timer, finishing the timing registration;

Step S214, the PTT terminal shuts down the timing registration timer, finishing the timing registration.

In addition, the method further comprises performing a timing registration of PTT waiting, which is performed before the timing registration timer expires for the first time in the Step S202.

In addition, in the method, the terminal comprises a waiting registration timer and a waiting registration message counter. The PTT waiting registration process comprises:

Step S300, the initial value of the waiting registration message counter is set as N;

Step S302, the time length of the waiting registration timer is set as the value which is n times of the initial value of the waiting registration message counter, and when the waiting registration timer expires, turning to Step S304;

Step S304, the PTT terminal initiates a registration to the dispatching server wherein the terminal sends a PTT registration message to a base station on the control channel through the PTT registration message, and then the base station sends a PTT registration message to the dispatching server;

Step S306, after having sent the PTT registration message, the PTT terminal starts the registration timer and waits for a registration response message from the base station;

Step S308, upon having received the registration response message of the PTT terminal, the base station sends to the PTT terminal a PTT registration response message containing answer information;

Step S310, if receiving the registration acceptance message from the base station, the PTT terminal shuts down the registration timer and turns to Step S314; if receiving a registration refusal message responded from the base station, the PTT terminal shuts down the registration timer and turns to Step S316; if when the registration timer expires the PTT terminal has not received a response message from the base station, the process goes to S312;

Step S312, the value of the waiting registration timer is assigned to the waiting registration message counter wherein if the value of the timing registration counter is less than M, turning to S302, and otherwise if the value of the timing registration counter is greater than or equal to M, the waiting registration timer is shut down, finishing the waiting registration;

Step S314, the registration succeeds, and the terminal shuts down the waiting registration timer and the timing registration timer, finishing the registration;

Step S316, the registration is failed, and the terminal shuts down the waiting registration timer and the timing registration timer, finishing the registration.

In addition, in the method, the PTT registration message is embodied by a SDB message.

The method of the terminal PTT registration based on the CDMA trunking system according to the present invention is executed after the CDMA system registration is finished, comprising:

Step S404, the terminal sends a PTT registration message to the dispatching server and starts the registration timer; and Step S406, performing corresponding process according to the response by the dispatching server.

In addition, in the method, the response situation comprises: (1) the dispatching server receiving a PTT registration message and returning to the terminal a PTT registration acceptance message representative of accepting the registration, (2) the dispatching server refusing the PTT registration message and returning to the terminal a PTT registration refusal message representative of refusing the registration, and (3) the PTT registration timer expiring and no response being returned.

In addition, in the method, when the situation (1) occurs, Step S406 comprises: the terminal receiving a PTT registration acceptance message, the registration succeeding, the PTT registration timer being shut down and the registration flow be finished. When the situation (2) occurs, Step S406 comprises: the terminal receiving a PTT registration refusal message, the registration failing, the PTT registration timer being shut down and the registration flow be finished. When the situation (3) occurs, Step S406 comprises: the value of the registration message counter being subtracted by 1 wherein if the value after the subtraction is greater than 0, going to Step S404, otherwise the registration does not succeed.

In addition, in the method, the terminal further comprises a PTT timing registration timer. When the registration does not succeed, it goes to the timing registration process. Before the PTT timing registration timer expires for the first time during the timing registration procedure, it goes to the waiting registration process.

In addition, in the method, the timing registration process comprises:

Step S502, the time length of the timing registration timer is set as M and the timer is started wherein when the timing registration timer expires, it turns to Step S504;

Step S504, the PTT terminal initiates a registration to the dispatching server wherein the terminal sends a PTT registration message to the base station on the control channel through the PTT registration message, and the base station initiates a registration to the dispatching server;

Step S506, after sending the PTT registration message, the PTT terminal starts the registration timer and waits for a response message from the base station;

Step S508, after receiving the registration response message from the PTT terminal, the base station sends to the PTT terminal a PTT registration message containing answer information;

Step S510, if the PTT terminal receives a registration acceptance message responded from the base station, then the PTT terminal shuts down the registration timer, turning to Step S512; if the PTT terminal receives a registration refusal message responded from the base station, then the PTT terminal shuts down the registration timer, turning to Step S514; if the PTT terminal has not received the answer information from the base station when the registration timer expires, then it turns to Step S502;

Step S512, the registration succeeds and the PTT terminal shuts down the timing registration timer, finishing the timing registration;

Step S514, the PTT terminal shuts down the timing registration timer, finishing the timing registration.

In addition, in the method, the terminal comprises a waiting registration timer and a waiting registration message counter. The PTT waiting registration procedure comprises:

Step S602, the initial value of the waiting registration message counter is set as N;

Step S604, the time length of the waiting registration timer is set as n times of the initial value of the waiting registration message counter wherein when the waiting registration timer expires, it goes to Step S606;

Step S606, the PTT terminal initiates a registration to the dispatching server wherein the terminal sends a PTT registration message to a base station on the control channel through a PTT registration message, and then the base station sends the PTT registration message to the dispatching server;

Step S608, after having sent the PTT registration message, the PTT terminal starts the registration timer and waits for a registration response message from the base station;

Step S610, upon having received the registration response message of the PTT terminal, the base station sends to the PTT terminal a PTT registration response message containing answer information;

Step S612, if the PTT terminal receives the registration acceptance message responded by the base station, then the terminal shuts down the registration timer, turning to Step S616; if the PTT terminal receives a registration refusal message responded by the base station, then the PTT terminal shuts down the registration timer, turning to Step S618; if the PTT terminal has not received a response message from the base station when the registration timer expires, it goes to Step S614;

Step S614, the value of the waiting registration timer is assigned to the waiting registration message counter wherein if the value of the timing registration counter is less than M, then it goes to S604, otherwise if the value of the timing registration counter is greater than or equal to M, the waiting registration timer is shut down and the waiting registration process is finished;

Step S616, the registration succeeds and the terminal shuts down the waiting registration timer and the timing registration timer, finishing the registration;

Step S618, the registration is failed and the terminal shuts down the waiting registration timer and the timing registration timer, finishing the registration.

In addition, in the method, the PTT registration message is transmitted on the control channel. The PTT registration message is embodied by the short data burst (SDB) message.

The terminal PTT registration system based on CDMA trunking system according to the present invention comprises: a registration device for providing a PTT registration message to a base station, answering a response message from the base station, and counting the execution times of the PTT registration message; a base station for sending the PTT registration message from a registration device to a dispatching server and forwarding a response message from the dispatching server to the registration device; a dispatching server for receiving a PTT registration message from the base station and sending to the base station a response message as the processing result of the trunking function; and a transmission channel for transmitting the PTT registration message.

In the system, the transmission channel for transmitting the PTT registration message is a control channel. The response message comprises a registration acceptance message representing that the dispatching server accepts the PTT registration message and a registration refusal message representing that the dispatching server refuses the PTT registration message.

In addition, in the system, the registration device comprises: a registration message processing module for generating and sending a PTT registration message and answering the response message from the base station; a registration timer for periodically re-sending the PTT registration message to the base station when no registration acceptance message is received from the base station; and a registration message counter for recording how many times that the registration message processing module sends the PTT registration message.

In addition, in the system, the registration device further comprises: a waiting registration timer for sending a PTT registration message to the base station, when no registration acceptance message is received from the base station and the timing registration timer has not activated; and a timing registration timer for sending a PTT registration message to the base station, when no registration acceptance message is received from the base station and the timing registration timer has been activated.

The present invention enables a terminal of CDMA trunking function to prevent the problem caused by a failed registration.

Other features and advantages of the present invention will be described in the following specification and partly apparent from the specification or through implementing the present invention. The purpose and other advantages of the present invention will be realized and obtained through the structure specified in the written specification, claims, and drawings.

BRIEF DESCRIPTION OF THE DRAWINGS

The drawings are provided for a further understanding of the present invention and forms a part of the specification to explain the present invention together with the embodiments thereof, rather than to limit the present invention, wherein.

DETAILED DESCRIPTION OF THE INVENTION

The preferred embodiments of the present invention will be described in connection with the drawings. It will be appreciated that the preferred embodiments are described herein only to explain and illustrate, not limiting the present invention.

In the embodiment, the method of a terminal PTT registration based on CDMA trunking system is provided.

Figure 1:
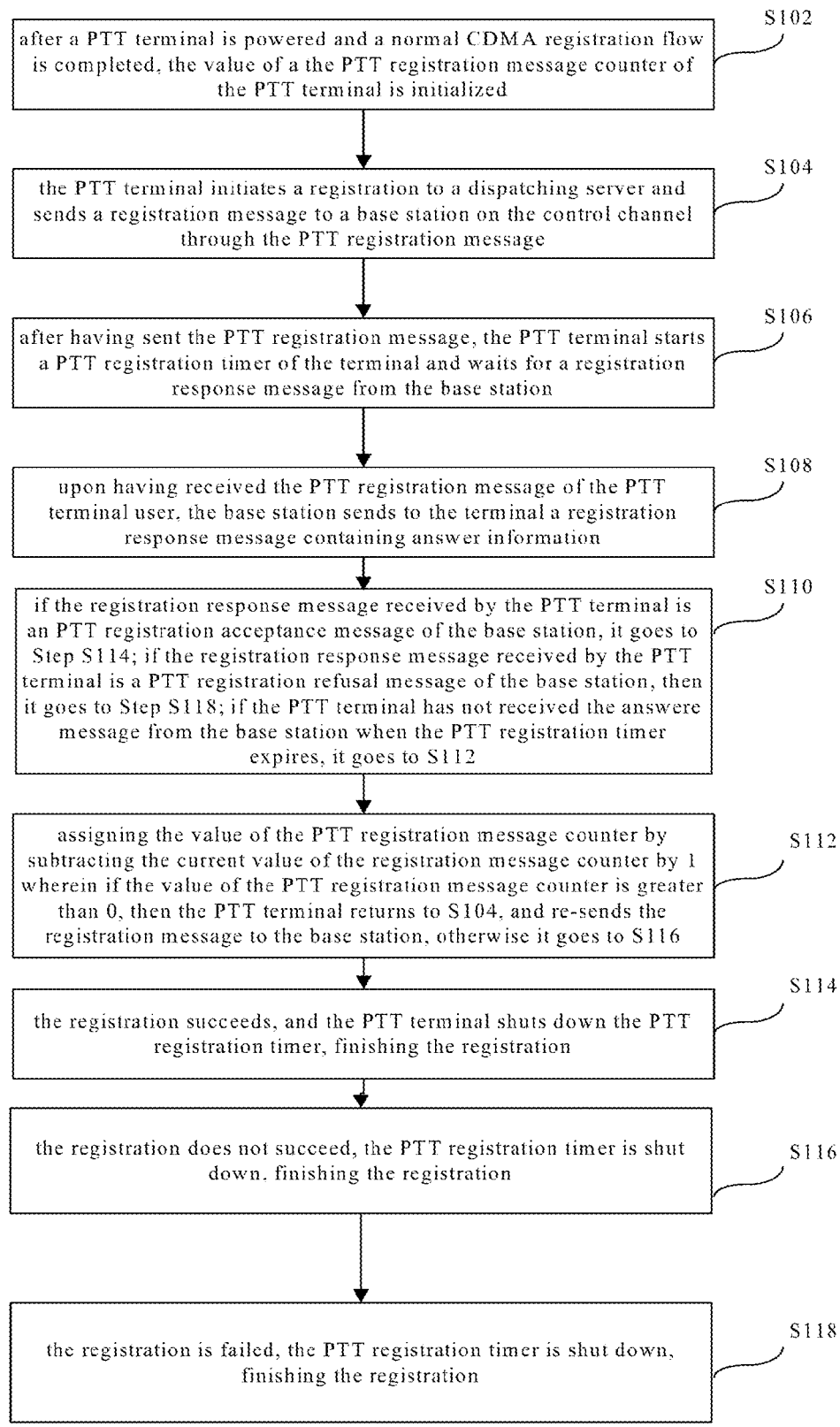
FIG. 1 is a flow chart showing a terminal PTT registration method based on CDMA trunking system according to an embodiment of the present invention.

FIG. 1 is a flow chart showing a terminal PTT registration method based on CDMA trunking system according to one embodiment of the present invention.

As shown in FIG. 1, the method of a terminal PTT registration based on CDMA trunking system comprises:

Step S102, after the PTT terminal is powered and a normal CDMA registration flow is completed, the value of a PTT registration message counter of the PTT terminal is initialized;

Step S104, the PTT terminal initiates a registration to the dispatching server and sends a registration message to a base station on the control channel through a PTT registration message;

Step S106, after having sent the PTT registration message, the PTT terminal starts the PTT registration timer of the terminal and waits for a registration response message from the base station;

Step S108, upon having received the PTT registration message of the PTT terminal user, the base station sends to the terminal a registration response message containing answer information;

Step S110, if the registration response message received by the PTT terminal is a PTT registration acceptance message of the base station, then it goes to Step S114; if the registration response message received by the PTT terminal is a PTT registration refusal message of the base station, then it goes to Step S118; if the PTT terminal has not received a response message from the base station when the PTT registration timer expires, it goes to S112;

Step S112, the value of PTT registration message counter is assigned with the value which is obtained by subtracting the current value of the registration message counter by 1, wherein if the value of the PTT registration message counter is greater than 0, then the PTT terminal returns to S104, and re-sends a PTT registration message to the base station, otherwise turning to S116;

Step S114, the registration succeeds, and the PTT terminal shuts down the PTT registration timer, finishing the registration;

Step S116, the registration does not succeeds, and the PTT registration timer is shut down, finishing the registration;

Step S118, the registration is failed and the PTT registration timer is shut down, finishing the registration.

Figure 9:
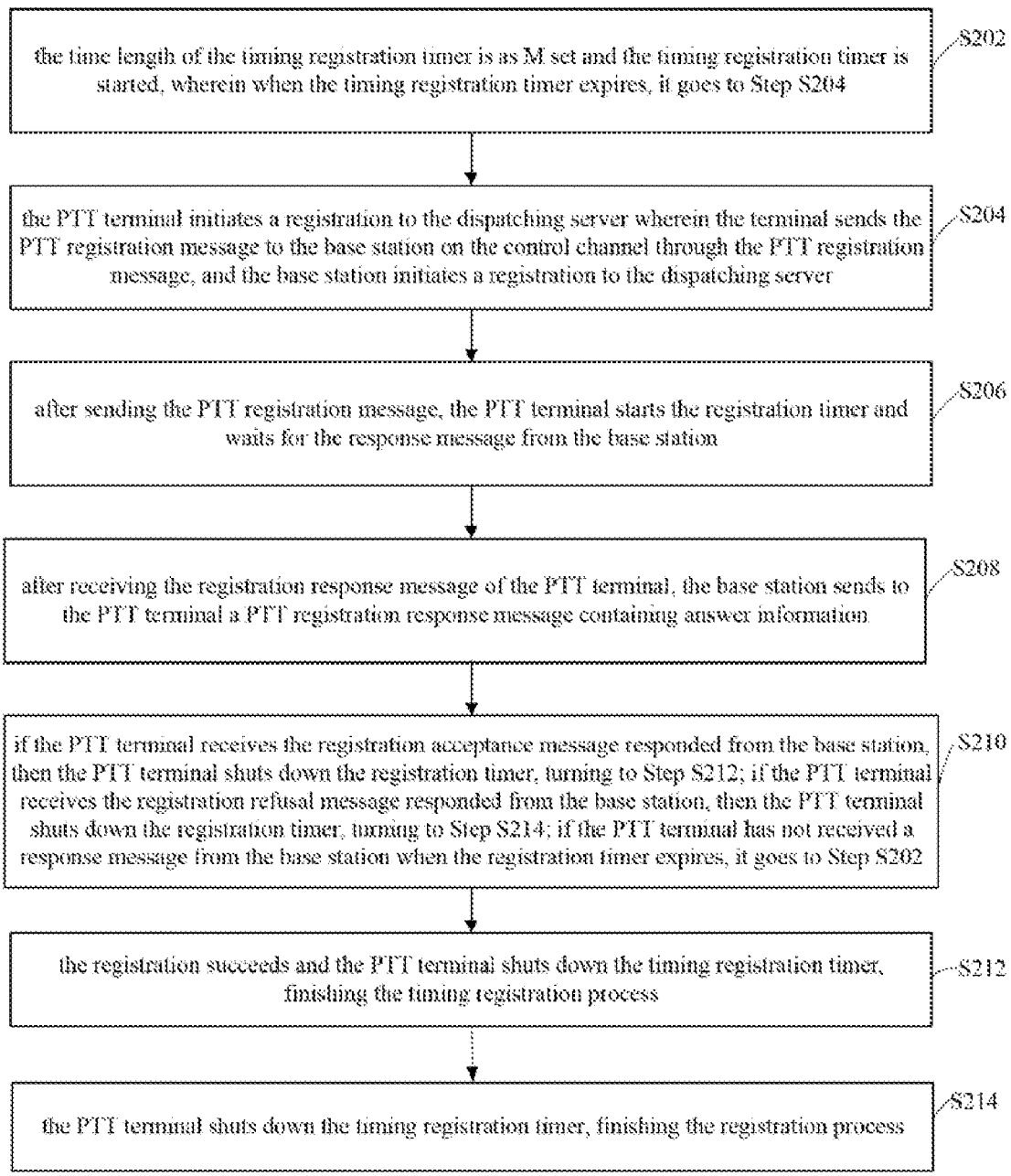
FIG. 9 is a flow chart showing starting a timing registration process according to some embodiments of the present invention.

In addition, in the present method, the terminal further comprises a timing registration timer, and after Step S116 the method further comprises starting the timing registration process. As shown in FIG. 9, the registration process comprises:

Step S202, the time length of the timing registration timer is set as M and the timing registration timer is started wherein when the timing registration timer expires, it goes to Step S204;

Step S204, the PTT terminal initiates a registration to the dispatching server wherein the terminal sends a PTT registration message to the base station on the control channel through the PTT registration message, and the base station initiates a registration to the dispatching server;

Step S206, after sending the PTT registration message, the PTT terminal starts the registration timer and waits for a response message from the base station;

Step S208, after receiving the registration response message from the PTT terminal, the base station sends to the PTT terminal a PTT registration response message containing answer information;

Step S210, if the PTT terminal receives a registration acceptance message responded from the base station, then the PTT terminal shuts down the registration timer, turning to Step S212; if the PTT terminal receives a registration refusal message responded from the base station, then the PTT terminal shuts down the registration timer, turning to Step S214; if the PTT terminal has not received the answer information from the base station when the registration timer expires, it goes to Step S202;

Step S212, the registration succeeds and the PTT terminal shuts down the timing registration timer, finishing the timing registration;

Step S214, the PTT terminal shuts down the timing registration timer, finishing the timing registration.

In addition, the method further comprises performing the PTT waiting timing registration before the timing registration timer expires for the first time in the Step S202.

Figure 10:
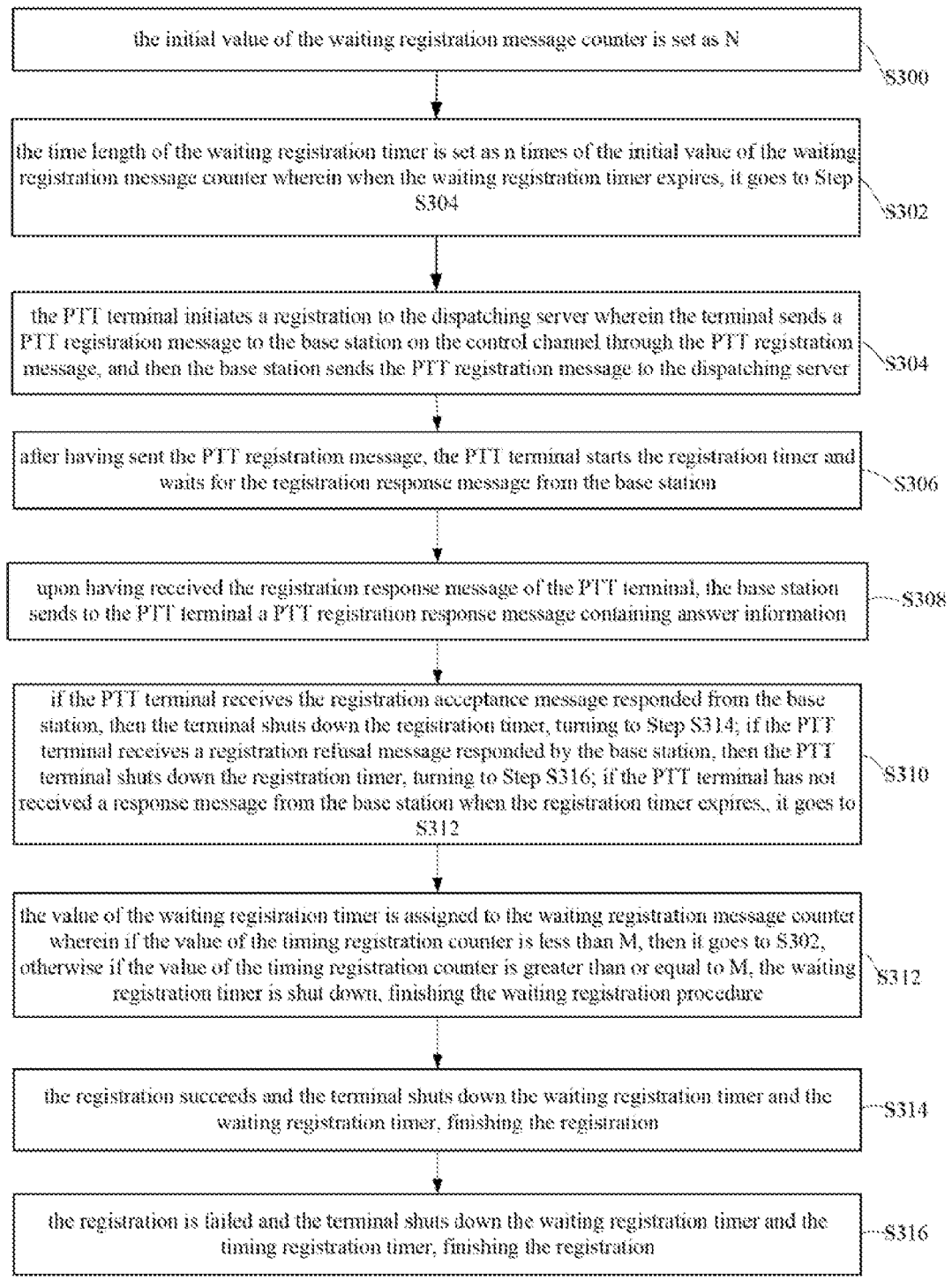
FIG. 10 is a flow chart showing the PTT waiting registration process according to some embodiments of the present invention.

In addition, in the method, the terminal comprises a waiting registration timer and a waiting registration message counter. As shown in FIG. 10, the PTT waiting registration procedure comprises:

Step S300, the initial value of the waiting registration message counter is set as N;

Step S302, the time length of the waiting registration timer is set as n times of the initial value of the waiting registration message counter wherein when the waiting registration timer expires, it goes to Step S304;

Step S304, the PTT terminal initiates a registration to the dispatching server wherein the terminal sends a PTT registration message to a base station on the control channel through the PTT registration message, and then the base station sends the PTT registration message to the dispatching server;

Step S306, after having sent the PTT registration message, the PTT terminal starts the registration timer and waits for a registration response message from the base station;

Step S308, upon having received the registration response message of the PTT terminal, the base station sends to the PTT terminal a PTT registration response message containing answer information;

Step S310, if the PTT terminal receives the registration acceptance message responded from the base station, then the terminal shuts down the registration timer, turning to Step S314; if the PTT terminals receives a registration refusal message responded by the base station, then the PTT terminal shuts down the registration timer, turning to Step S316; if the PTT terminal has not received a response message from the base station when the registration timer expires, it goes to S312;

Step S312, the value of the waiting registration timer is assigned to the waiting registration message counter wherein if the value of the timing registration counter is less than M, then it goes to S302, otherwise if the value of the timing registration counter is greater than or equal to M, the waiting registration timer is shut down, finishing the waiting registration;

Step S314, the registration succeed and the terminal shuts down the waiting registration timer and the timing registration timer, finishing the registration;

Step S316, the registration is failed and the terminal shuts down the waiting registration timer and the timing registration timer, finishing the registration.

In addition, in the method, the PTT registration message is embodied by a SDB message.

Figure 2:
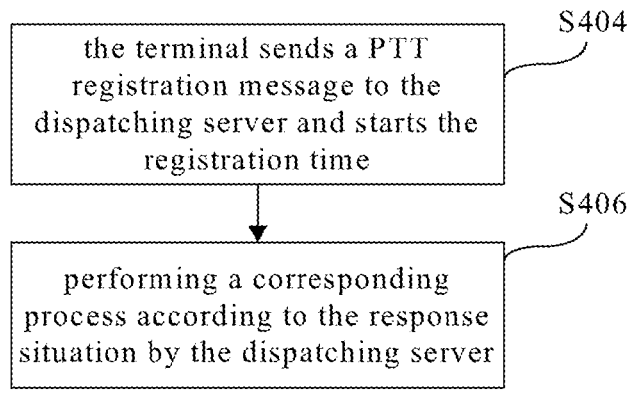
FIG. 2 is a flow chart showing a terminal PTT registration method based on CDMA trunking system according to another embodiment of the present invention.

FIG. 2 is a flow chart showing a terminal registration method based on CDMA trunking system according to another embodiment of the present invention.

As shown in FIG. 2, the terminal registration method based on CDMA trunking system comprises:

Step S404, the terminal sends a PTT registration message to the dispatching server and starts the PTT registration timer; and Step S406, performing corresponding process based on the response situation by the dispatching server.

In addition, in the method, response situation comprises: (1) the dispatching server receiving a PTT registration message and returning to the terminal a PTT registration acceptance message representative of accepting the registration, (2) the dispatching server refusing the PTT registration message and returning to the terminal a PTT registration refusal message representative of refusing the registration, and (3) the PTT registration timer expiring and no response being returned.

In addition, in the method, when the situation (1) occurs, the Step S406 comprises: the terminal receiving a PTT registration acceptance message, the registration succeeding, the PTT registration timer being shut down and finishing the registration. When the situation (2) occurs, the Step S406 comprises: the terminal receiving a PTT registration refusal message, the registration being failed, shutting down the PTT registration timer and finishing the registration. When the situation (3) occurs, the Step S406 comprises: the value of the registration message counter being subtracted by 1 wherein if the value after the subtraction is greater than 0, it goes to Step S404, otherwise the registration does not succeed.

In addition, in the method, the terminal further comprises a PTT timing registration timer. When the registration does not succeed, it goes to the timing registration process. Before the PTT timing registration timer expires for the first time during the timing registration procedure, it goes to the waiting registration procedure.

Figure 11:
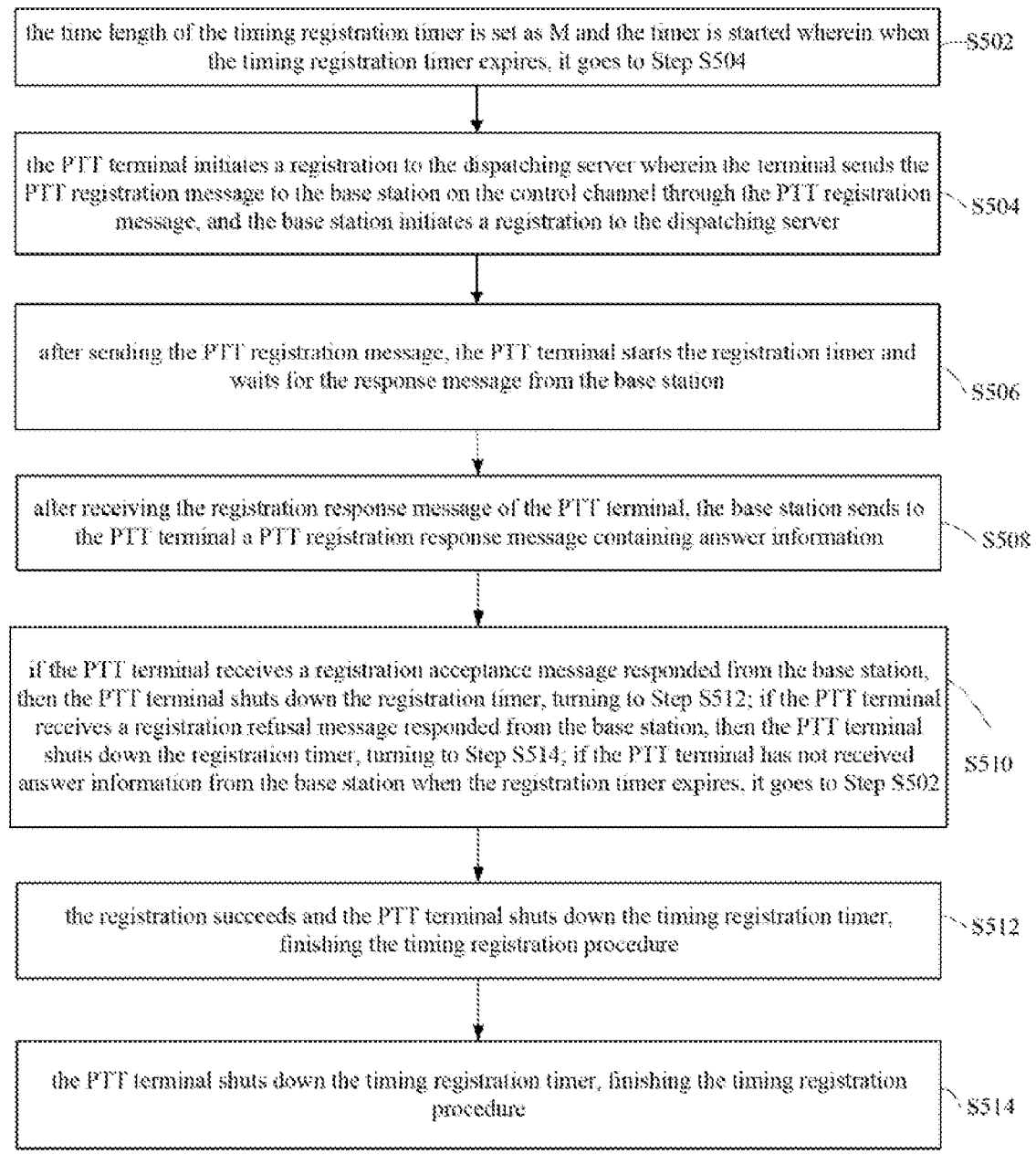
FIG. 11 is a flow chart showing a timing registration procedure according to some embodiments of the present invention.

In addition, in the method, as shown in FIG. 11, the timing registration procedure comprises:

Step S502, the time length of the timing registration timer is set as M and the timer is started wherein when the timing registration timer expires, it goes to Step S504;

Step S504, the PTT terminal initiates a registration to the dispatching server wherein the terminal sends a PTT registration message to the base station on the control channel through the PTT registration message, and the base station initiates a registration to the dispatching server;

Step S506, after sending the PTT registration message, the PTT terminal starts the registration timer and waits for a response message from the base station;

Step S508, after receiving the registration response message from the PTT terminal, the base station sends to the PTT terminal a PTT registration response message containing answer information;

Step S510, if the PTT terminal receives a registration acceptance message from the base station, then the PTT terminal shuts down the registration timer, turning to Step S512; if the PTT terminal receives a registration refusal message responded from the base station, then the PTT terminal shuts down the registration timer, turning to Step S514; if the PTT terminal has not received the answer information from the base station when the registration timer expires, it goes to Step S502;

Step S512, the registration succeeds and the PTT terminal shuts down the timing registration timer, finishing the timing registration;

Step S514, the PTT terminal shuts down the timing registration timer, finishing the timing registration.

Figure 12:
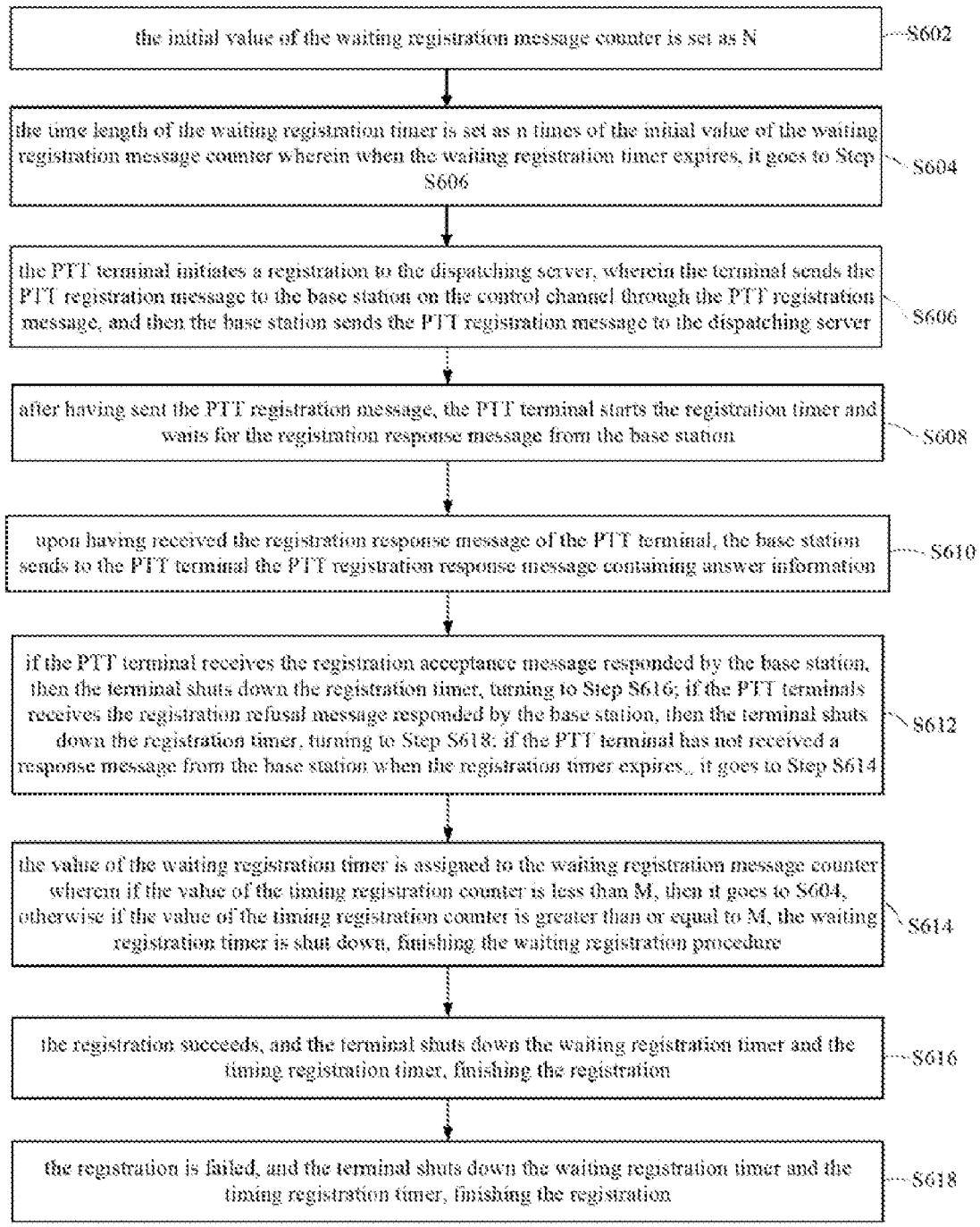
FIG. 12 is a flow chart showing the PTT waiting registration procedure according to some embodiments of the present invention.

In addition, in the method, the terminal comprises a waiting registration timer and a waiting registration message counter. As shown in FIG. 12, the PTT waiting registration procedure comprises:

Step S602, the initial value of the waiting registration message counter is set as N;

Step S604, the time length of the waiting registration timer is set as n times of the initial value of the waiting registration message counter wherein when the waiting registration timer expires, it goes to Step S606;

Step S606, the PTT terminal initiates a registration to the dispatching server, wherein the terminal sends a PTT registration message to a base station on the control channel through the PTT registration message, and then the base station sends the PTT registration message to the dispatching server;

Step S608, after having sent the PTT registration message, the PTT terminal starts the registration timer and waits for a registration response message from the base station;

Step S610, upon having received the registration response message of the PTT terminal, the base station sends to the PTT terminal a PTT registration response message containing answer information;

Step S612, if the PTT terminal receives the registration acceptance message responded by the base station, then the terminal shuts down the registration timer, turning to Step S616; if the PTT terminals receives a registration refusal message responded by the base station, then the PTT terminal shuts down the registration timer, turning to Step S618; if the PTT terminal has not received a response message from the base station when the registration timer expires, it goes to Step S614;

Step S614, the value of the waiting registration timer is assigned to the waiting registration message counter wherein if the value of the timing registration counter is less than M, then it goes to S604, otherwise if the value of the timing registration counter is greater than or equal to M, the waiting registration timer is shut down, finishing the waiting registration;

Step S616, the registration succeeds and the terminal shuts down the waiting registration timer and the timing registration timer, finishing the registration;

Step S618, the registration is failed and the terminal shuts down the waiting registration timer and the timing registration timer, finishing the registration.

In addition, in the method, the PTT registration message is transmitted on the control channel. The PTT registration message is embodied by the short data burst (SDB) message.

Figure 3:
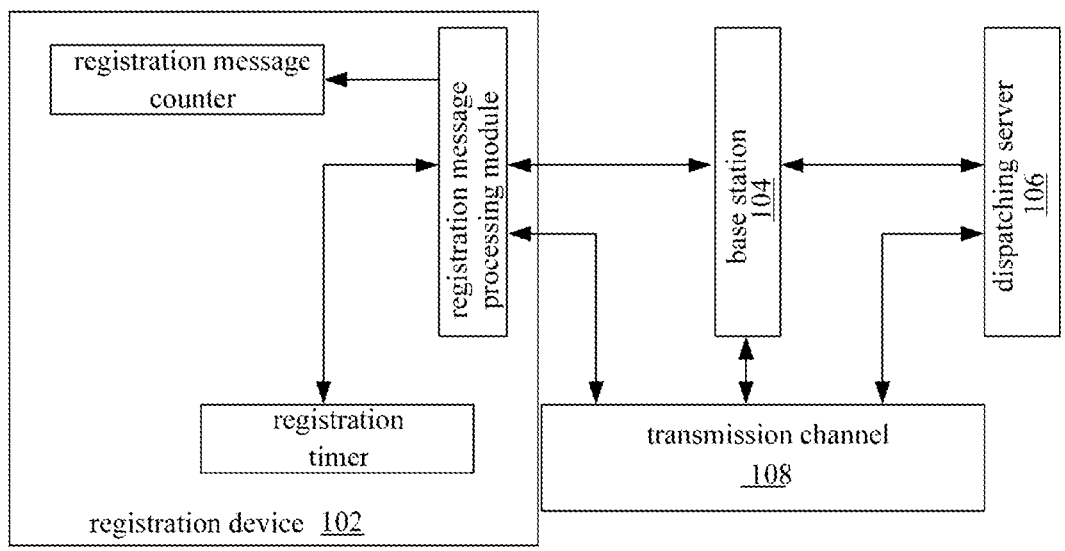
FIG. 3 is a schematic view of a terminal registration system based on CDMA trunking system according to the embodiment of the present invention.

FIG. 3 is a schematic view of a terminal PTT registration system based on CDMA trunking system according to the embodiment of the present invention.

As shown in FIG. 3, it is comprised: a registration device 102 for providing a PTT registration message to a base station, answering a response message from the base station, and counting the execution times of the PTT registration message; a base station 104 for sending the PTT registration message from the registration device to a dispatching server and forwarding a response message from the dispatching server to the registration device; a dispatching server 106 for receiving the PTT registration message from the base station and sending to the base station a response message as the processing result of the trunking function; and a transmission channel 108 for transmitting the PTT registration message.

In the system, the transmission channel for transmitting the PTT registration message is a control channel. The response message comprises a registration acceptance message representing that the dispatching server accepts the PTT registration message and a registration refusal message representing that the dispatching server refuses the PTT registration message.

In addition, in the system, the registration device comprises: a registration message processing module for generating and sending a PTT registration message and answering the response message from the base station; a registration timer for periodically re-sending the PTT registration message to the base station when no registration acceptance message is received from the base station; and a registration message counter for counting the times that the registration message processing module transmits the PTT registration message.

Figure 4:
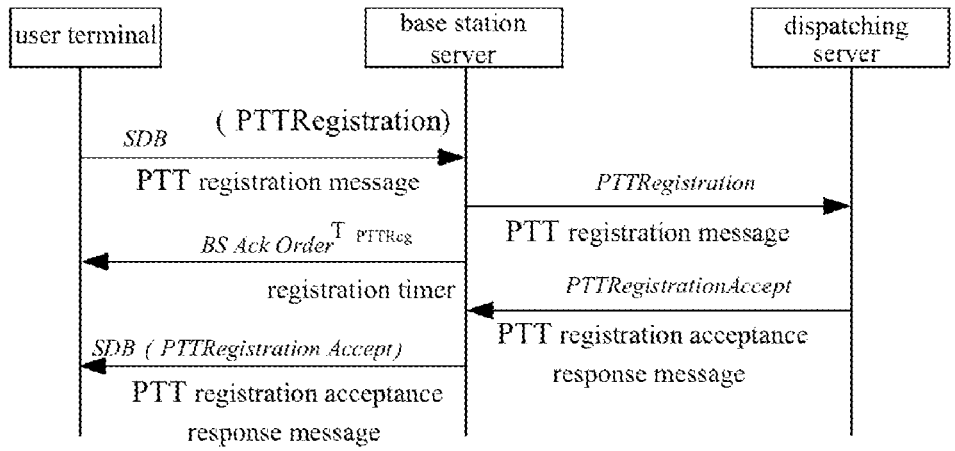
FIG. 4 is an interactive schematic view of the terminal, base station and dispatching server when the terminal registration succeeds according to the present invention.

In addition, in the system, the registration device further comprises: a waiting registration timer for sending a PTT registration message to the base station when no registration acceptance message is received from the base station and the timing registration timer is not activated; and a timing registration timer for sending a PTT registration message to the base station when no registration acceptance message is received from the base station and the timing registration timer has been activated;

FIG. 4 is an interactive schematic view of the terminal, base station and dispatching server when the terminal user registration succeeds according to the present invention. As shown in FIG. 4, one PTT terminal user presses the key for powering on the terminal, entering the logging-on procedure, and the value of the registration message counter is initialized as 5. After the terminal successfully accesses to CDMA network, the PTT registration begins. The terminal sends to the base station a PTT registration message which is in SDB format transmitted on the control channel, and at the same time starts the registration timer TPTTReg, reads in the value of the registration message counter wherein the value is 3, assigning the registration message counter by subtracting the current value by 1 (thus the value is 2 now), and begins to wait for a response message from the base. Upon receiving the PTT registration message, the base station confirms that the user is a valid user and returns a PTT registration acceptance response message to the user. When the user receives the registration response message, the registration timer is shut down and the terminal is set in the status of succeeded registration.

Figure 5:
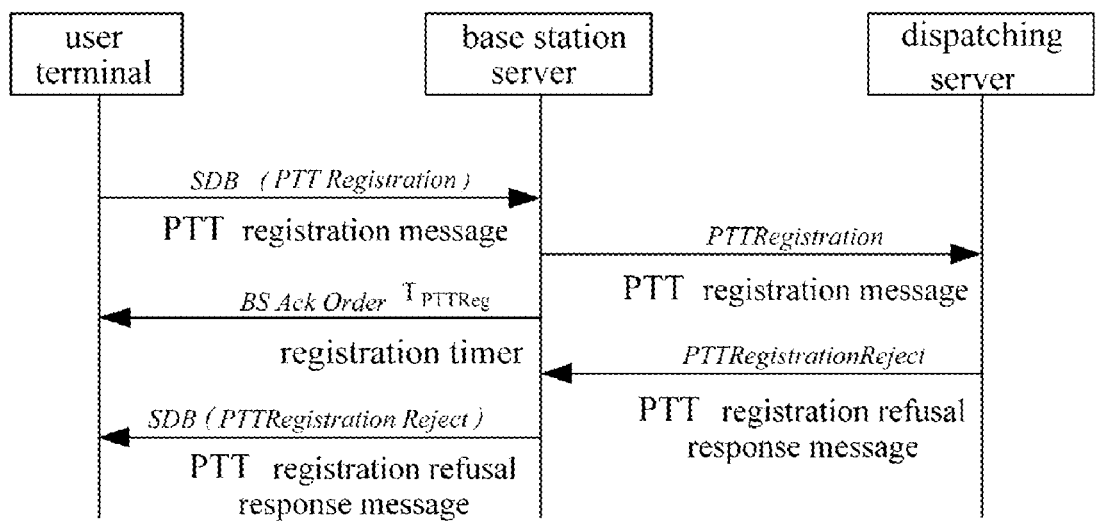
FIG. 5 is an interactive schematic view of a terminal, a base station and a dispatching server when the terminal registration is failed according to the present invention.

FIG. 5 is an interactive schematic view of the terminal, base station and dispatching server when the terminal user registration is failed according to the present invention. As shown in FIG. 5, one PTT terminal user presses the key for powering on the terminal, entering the logging-on procedure, and the value of the registration message counter is initialized as 5. When the terminal successfully accesses to CDMA network, the PTT registration begins, the terminal sends to the base station a PTT registration message which is in SDB format transmitted on the control channel, and at the same time starts the registration timer TPTTReg, reads in the value of the registration message counter wherein the value is 5, assigning the registration message counter by subtracting the current value by 1 (thus the value is 4 now), and begins to wait for a response message from the base station. Upon receiving the registration message, the base station confirms that the user is an invalid user and returns a PTT registration refusal response message to the user. When the user receives the registration response message, the registration timer is shut down and the terminal is set in the status of finished registration (failed).

Figure 6:
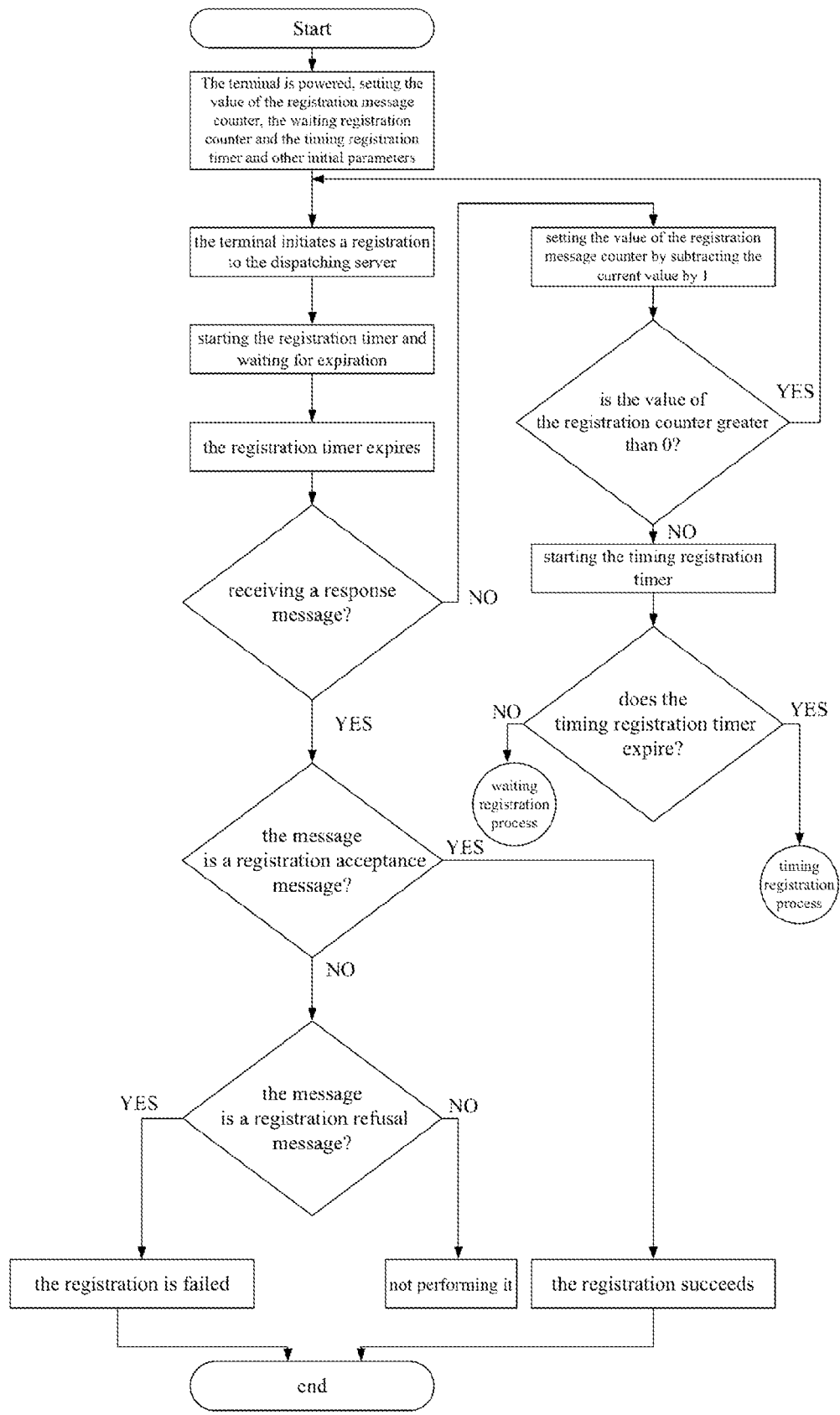
FIG. 6 is a flow chart showing the registration process of a terminal user according to the present invention.
Figure 7:
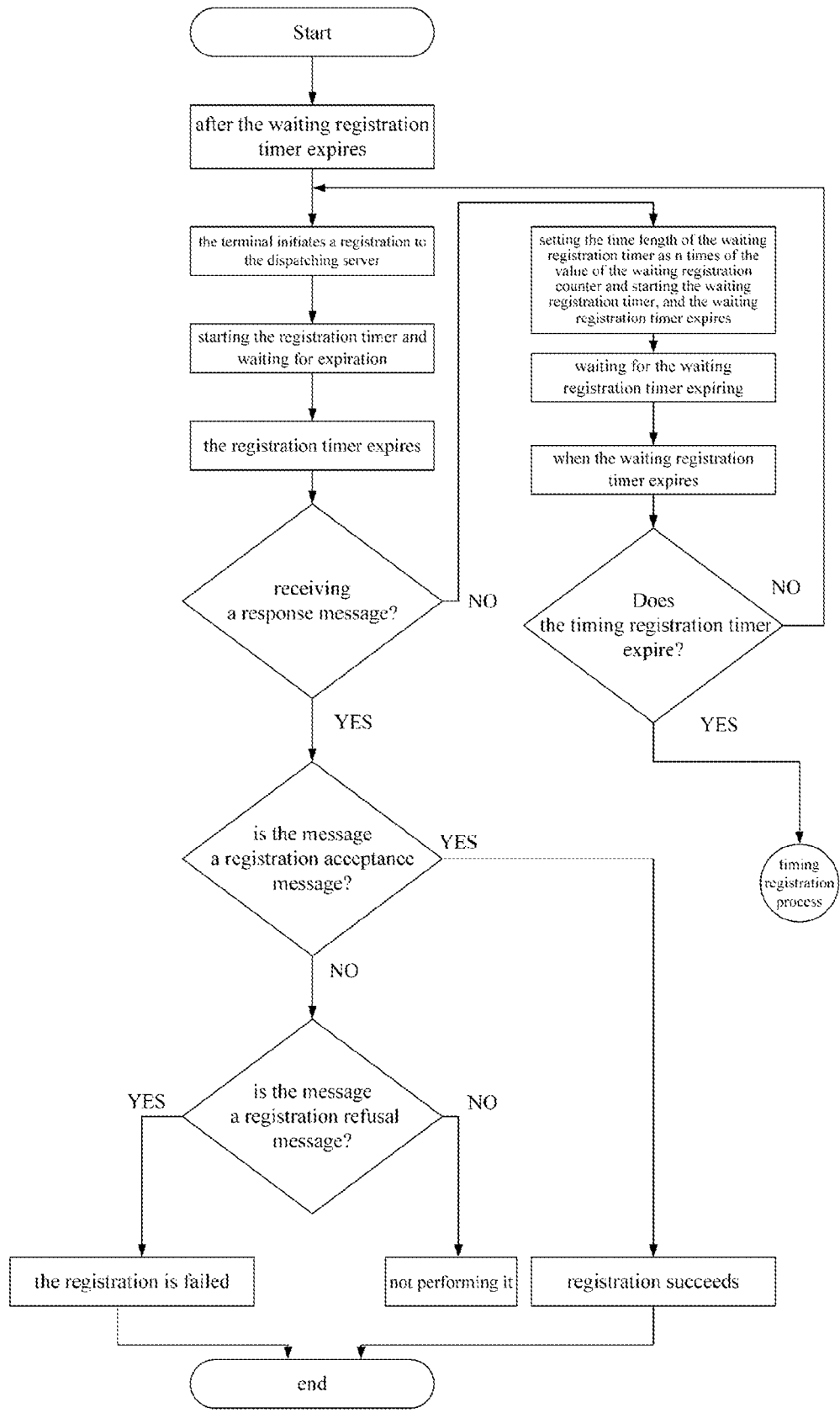
FIG. 7 is a flow chart showing the waiting registration process of a terminal user registration according to the present invention.

FIG. 6 is a flow chart showing a terminal user registration process according to the present invention; FIG. 7 is a flow chart showing the waiting registration process of the terminal user registration process according to the present invention; and FIG. 8 is a flow chart showing the timing registration process of the terminal user registration process according to the present invention.

Figure 8:
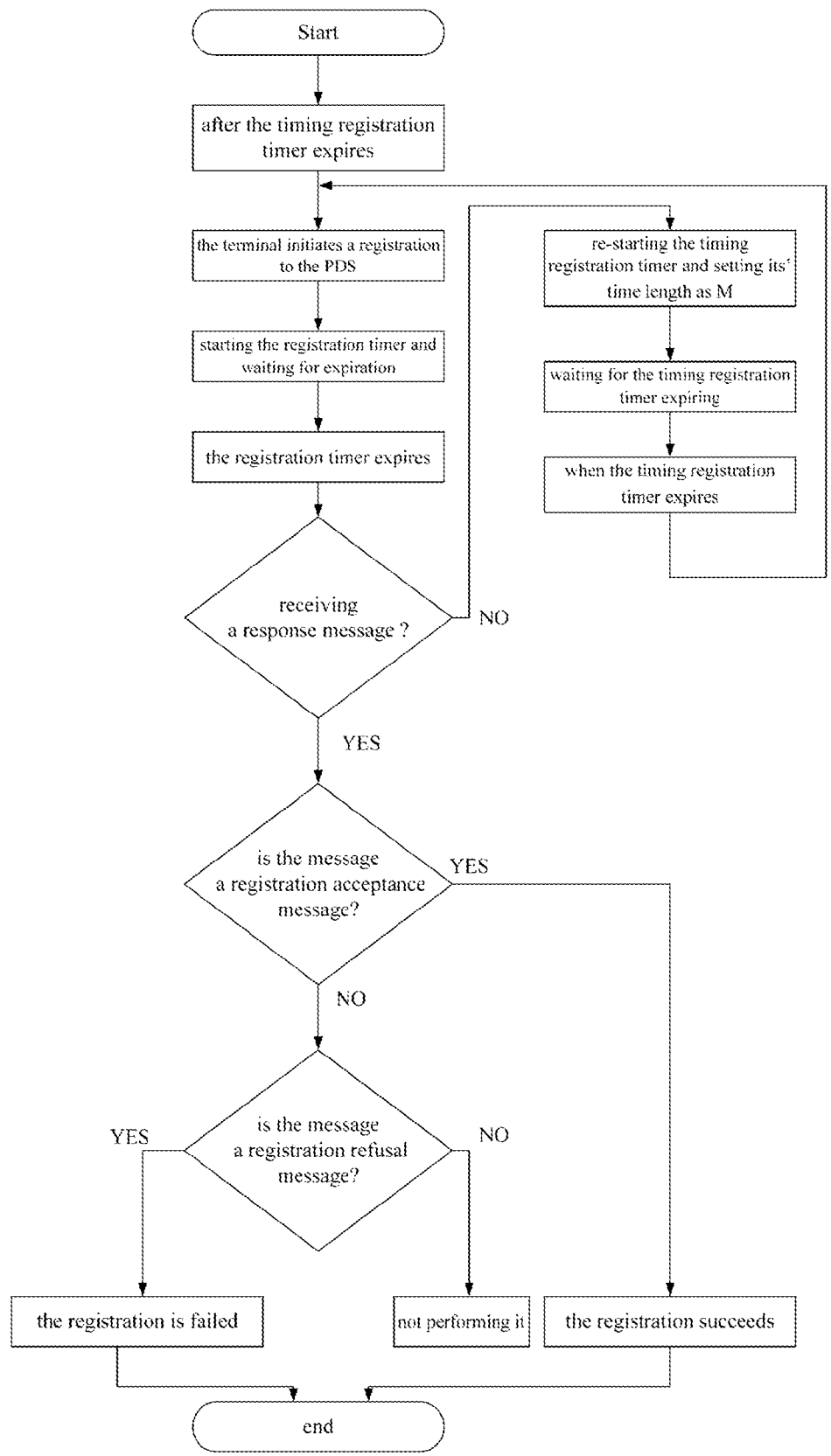
FIG. 8 is a flow chart showing the timing registration process of a terminal user registration according to the present invention.

Referring to FIGS. 6-8, one PTT terminal user presses the key for powering on the terminal, entering the logging-on procedure, and the value of the registration message counter is initialized as 3. The initial value of the waiting registration message counter is set as 3000 ms, the time length of the TPTTReg timer. M is set as 25 minutes, and n as 2. When the terminal successfully accesses to CDMA network, the PTT registration begins, the terminal sends to the base station a PTT registration message which is in SDB format transmitted on the control channel, and at the same time starts the registration timer TPTTReg, reads in the value of the registration message counter wherein the value is 3, sets the value of the registration message counter by subtracting the current value by 1 (i.e., 2 now), and begins to wait for a response message from the base station side. When the registration timer expires, no response message is received from the base station side, and at this time, the terminal reads the value of the registration message counter wherein if the vale is 2, which is greater than 0, then the terminal re-sends a PTT registration message to the base station and sets the registration message counter as 1. When the registration timer expires again and no response message is received from the base station side, the terminal reads the value of the registration message counter wherein if the vale is 1, the terminal re-sends a PTT registration message to the base station and sets the value of the registration message counter as 0. When the registration timer expires again and still no response message is received from the base station side, the terminal reads the registration message counter, finding the value is 0, and therefore enters the waiting registration procedure. The value of the waiting registration message counter is 3000 ms, and the time length of the waiting registration timer is set as 6000 ms. When the waiting registration timer expires while the timing registration timer has not expired, the registration process is re-initiated, but still no message is received after TPTTReg expires. The next waiting registration timer is set as 2*6000 ms=12 s. When the waiting registration timer expires, since the timing registration timer has not expired, a registration procedure is re-initiated. Nevertheless, after the TPTTReg expires, no message is received. The next waiting registration timer is set as 2*12 s=24 s. If the waiting registration timer has not expires while the timing registration timer has expired, the timing registration process is initiated. The PTT registration message is sent to the system every 25 minutes till the registration succeeds or does not succeed.

By the above aspects of the present invention, the terminal based on CDMA trunking function can avoid the problem arising from failed registration.

Above description is used to illustrate the preferred embodiments, but not limit the present invention. Various alterations and changes to the present invention are apparent to those skilled in the art. The scope defined in claims of the present invention shall cover any modifications, equivalent substitutions and improvements in the spirit and principle of the present invention.

What is claimed is:

1. A method of terminal Push to Talk (PTT) registration based on CDMA trunking system, comprising:

Step S102, after a PTT terminal is powered and a normal CDMA registration flow is completed, the value of a PTT registration message counter of the PTT terminal is initialized;

Step S104, the PTT terminal initiates a registration to a dispatching server and sends a PTT registration message to a base station on a control channel through the PTT registration message;

Step S106, after having sent the PTT registration message, the PTT terminal starts a PTT registration timer of the terminal and waits for a registration response message from the base station;

Step S108, upon having received the PTT registration message of the PTT terminal user, the base station sends to the terminal a registration response message containing answer information;

Step S110, if the registration response message received by the PTT terminal is a PTT registration acceptance message of the base station, then it goes to Step S114, wherein the registration succeeds and the PTT terminal shuts down the PTT registration timer, finishing the registration; if the registration response message received by the PTT terminal is a PTT registration refusal message of said the base station, then it goes to Step S118, wherein the registration is failed and the PTT registration timer is shut down, finishing the registration; if the PTT terminal has not received the response message from the base station when the PTT registration timer expires, it goes to S112; and Step S112, the value of the PTT registration message counter is assigned by subtracting the current value of the registration message counter by 1 wherein if the value of the PTT registration message counter is greater than 0, then the PTT terminal returns to S104, re-sending the PTT registration message to the base station, otherwise it turns to S116, wherein the registration does not succeed and the PTT registration timer is shut down, finishing the registration.

2. The method of terminal PTT registration based on CDMA trunking system according to claim 1, wherein the terminal further comprises a timing registration timer, and the method further comprises starting a timing registration process after the Step S116, wherein the registration does not succeed and the PTT registration timer is shut down, finishing the registration.

3. The method of terminal PTT registration based on CDMA trunking system according to claim 2, wherein the timing registration process comprises:

Step S202, the time length of the timing registration timer is as M set and the timing registration timer is started, wherein when the timing registration timer expires, it goes to Step S204;

Step S204, the PTT terminal initiates a registration to the dispatching server wherein the terminal sends the PTT registration message to the base station on the control channel through the PTT registration message, and the base station initiates a registration to the dispatching server;

Step S206, after sending the PTT registration message, the PTT terminal starts the registration timer and waits for the response message from the base station;

Step S208, after receiving the registration response message of the PTT terminal, the base station sends to the PTT terminal a PTT registration response message containing answer information; and Step S210, if the PTT terminal receives the registration acceptance message responded from the base station then the PTT terminal shuts down the registration timer, turning to Step S212, wherein the registration succeeds and the PTT terminal shuts down the timing registration timer, finishing the timing registration process; if the PTT terminal receives the registration refusal message responded from the base station, then the PTT terminal shuts down the registration timer, turning to Step S214, wherein the PTT terminal shuts down the timing registration timer, finishing the registration process; if the PTT terminal has not received a response message from the base station when the registration timer expires, it goes to Step S202, wherein the time length of the timing registration timer is as M set and the timing registration timer is started, wherein when the timing registration timer expires, it goes to Step S204, wherein the PTT terminal initiates a registration to the dispatching server wherein the terminal sends the PTT registration message to the base station on the control channel through the PTT registration message, and the base station initiates a registration to the dispatching served.

4. The method of terminal PTT registration based on CDMA trunking system according to claim 3, wherein the method comprises performing a PTT waiting timing registration process before the timing registration timer expires for the first time in the Step S202, wherein the time length of the timing registration timer is as M set and the timing registration timer is started, wherein when the timing registration timer expires, it goes to Step S204, wherein the PTT terminal initiates a registration to the dispatching server wherein the terminal sends the PTT registration message to the base station on the control channel through the PTT registration message, and the base station initiates a registration to the dispatching server.

5. The method of terminal PTT registration based on CDMA trunking system according to claim 4, wherein the terminal comprises a waiting registration timer and a waiting registration message counter, and the PTT waiting registration process comprises:

Step S300, the initial value of the waiting registration message counter is set as N;

Step S302, the time length of the waiting registration timer is set as n times of the initial value of the waiting registration message counter wherein when the waiting registration timer expires, it goes to Step S304;

Step S304, the PTT terminal initiates a registration to the dispatching server wherein the terminal sends a PTT registration message to the base station on the control channel through the PTT registration message, and then the base station sends the PTT registration message to the dispatching server;

Step S306, after having sent the PTT registration message, the PTT terminal starts the registration timer and waits for the registration response message from the base station;

Step S308, upon having received the registration response message of the PTT terminal, the base station sends to the PTT terminal a PTT registration response message containing answer information; and Step S310, if the PTT terminal receives the registration acceptance message responded from the base station, then the terminal shuts down the registration timer, turning to Step S314, wherein the registration succeeds and the terminal shuts down the waiting registration tinier and the waiting registration timer, finishing the registration; if the PTT terminal receives a registration refusal message responded by the base station, then the PTT terminal shuts down the registration timer, turning to Step S316, wherein the registration is failed and the terminal shuts down the waiting registration timer and the timing registration timer, finishing the registration; if the PTT terminal has not received a response message from the base station when the registration timer expires, it goes to S312, wherein the value of the waiting registration timer is assigned to the waiting registration message counter wherein if the value of the timing registration counter is less than M, then it goes to S302, wherein the time length of the waiting registration timer is set as n times of the initial value of the waiting registration message counter wherein when the waiting registration tinier expires, it goes to Step S304, wherein the PTT terminal initiates a registration to the dispatching server wherein the terminal sends a PTT registration message to the base station on the control channel through the PTT registration message, and then the base station sends the PTT registration message to the dispatching server; otherwise if the value of the timing registration counter is greater than or equal to M, the waiting registration tinier is shut down, finishing the waiting registration procedure.

6. The method of terminal PTT registration based on CDMA trunking system according to claim 1, wherein the PTT registration message is embodied by a SDB message.

7. A method of terminal Push to Talk (PTT) registration based on COMA trunking system, wherein the method is performed after a CDMA system registration is completed, and the method comprises:

Step S404, the terminal sends a PTT registration message to a dispatching server and starts a registration timer; and Step S406, performing a corresponding process according to the response situation by the dispatching server;

wherein the response situation comprises: situation (1) the dispatching server receiving a PTT registration message, and returning to the terminal a PTT registration acceptance message representative of accepting the registration, situation (2) the dispatching server refusing the PTT registration message and returning to the terminal a PTT registration refusal message representative of refusing the registration, and situation (3) the PTT registration timer expiring and no response being returned; wherein when the situation (3) occurs, the Step S406 comprises:

the value of the registration message counter being subtracted by 1 wherein if the value after the subtraction is greater than 0, it goes to Step S404, wherein the terminal sends a PTT registration message to a dispatching server and starts a registration timer; otherwise the registration does not succeed.

8. The method of terminal PTT registration based on CDMA trunking system according to claim 7, wherein when the situation (1) occurs, the Step S406 comprises:

the terminal receiving the PTT registration acceptance message, the registration succeeding, the PTT registration timer being shut down and the registration being finished.

9. The method of terminal PTT registration based on CDMA trunking system according to claim 7, wherein when the situation (2) occurs, the Step S406 comprises:

the terminal receiving the PTT registration refusal message, the registration being failed, the PTT registration timer being shut down and the registration being finished.

10. The method of terminal PTT registration based on CDMA trunking system according to claim 7, wherein the terminal further comprises a PTT timing registration timer wherein when the registration does not succeed, it goes to a timing registration procedure.

11. The method of terminal PTT registration based on CDMA trunking system according to claim 10, wherein before the PTT timing registration timer expires for the first time during the timing registration procedure, it goes to a waiting registration procedure.

12. The method of terminal PTT registration based on CDMA trunking system according to claim 11, wherein the terminal comprises a waiting registration timer and a waiting registration message counter, and the PTT waiting registration procedure comprises:

Step S602, the initial value of the waiting registration message counter is set as N;

Step S604, the time length of the waiting registration timer is set as n times of the initial value of the waiting registration message counter wherein when the waiting registration timer expires; it goes to Step S606;

Step S606, the PTT terminal initiates a registration to the dispatching server, wherein the terminal sends the PTT registration message to the base station on the control channel through the PTT registration message, and then the base station sends the PTT registration message to the dispatching server;

Step S608, after having sent the PTT registration message, the PTT terminal starts the registration timer and waits for the registration response message from the base station;

Step S610, upon having received the registration response message of the PTT terminal, the base station sends to the PTT terminal the PTT registration response message containing answer information;

Step S612, if the PTT terminal receives the registration acceptance message responded by the base station, then the terminal shuts down the registration timer, turning to Step S616, wherein the registration succeeds, and the terminal shuts down the waiting registration timer and the timing registration timer, finishing the registration; if the PTT terminals receives the registration refusal message responded by the base station, then the terminal shuts down the registration timer, turning to Step S618, wherein the registration is failed, and the terminal shuts down the waiting registration timer and the timing registration timer, finishing the registration; if the PTT terminal has not received a response message from the base station when the registration tinier expires, it goes to Step S614; and Step S614, the value of the waiting registration timer is assigned to the waiting registration message counter wherein if the value of the timing registration counter is less than M, then it goes to S604, wherein the time length of the waiting registration timer is set as n times of the initial value of the waiting registration message counter wherein when the waiting registration timer expires, it goes to Step S606, wherein the PTT terminal initiates a registration to the dispatching server, wherein the terminal sends the PTT registration message to the base station on the control channel through the PTT registration message, and then the base station sends the PTT registration message to the dispatching server, otherwise if the value of the timing registration counter is greater than or equal to M, the waiting registration timer is shut down, finishing the waiting registration procedure.

13. The method of terminal PTT registration based on CDMA trunking system according to claim 10, wherein the timing registration procedure comprises:

Step S502, the time length of the timing registration timer is set as M and the timer is started wherein when the timing registration timer expires, it goes to Step S504;

Step S504, the PTT terminal initiates a registration to the dispatching server wherein the terminal sends the PTT registration message to the base station on the control channel through the PTT registration message, and the base station initiates a registration to the dispatching server;

Step S506, after sending the PTT registration message, the PTT terminal starts the registration timer and waits for the response message from the base station;

Step S508, after receiving the registration response message of the PTT terminal, the base station sends to the PTT terminal a PTT registration response message containing answer information; and Step S510, if the PTT terminal receives a registration acceptance message responded from the base station, then the PTT terminal shuts down the registration timer, turning to Step S512, wherein the registration succeeds and the PTT terminal shuts down the timing registration timer, finishing the timing registration procedure; if the PTT terminal receives a registration refusal message responded from the base station, then the PTT terminal shuts down the registration timer, turning to Step S514, wherein the PTT terminal shuts down the timing registration timer, finishing the timing registration procedure; if the PTT terminal has not received answer information from the base station when the registration timer expires, it goes to Step S502, wherein the time length of the timing registration timer is set as M and the timer is started wherein when the timing registration timer expires, it goes to Step S504, wherein the PTT terminal initiates a registration to the dispatching server wherein the terminal sends the PTT registration message to the base station on the control channel through the PTT registration message, and the base station initiates a registration to the dispatching server.

14. The method of terminal PTT registration based on CDMA trunking system according to claim 7, wherein the PTT registration message is transmitted on the control channel.

15. The method of terminal PTT registration based on CDMA trunking system according to claim 7, wherein the PTT registration message is embodied by a short data burst format message.

16. A terminal Push to Talk (PTT) registration system based on CDMA trunking system, comprising:
- a registration device for providing a PTT registration message to a base station, answering a response message from the base station, and counting the execution times of the PTT registration message;
- the base station for sending the PTT registration message from the registration device to a dispatching server and forwarding the response message from the dispatching server to the registration device;
- the dispatching server for receiving the PTT registration message from the base station and sending to the base station the response message as the processing result of trunking function;
- a transmission channel for transmitting the PTT registration message;
- a waiting registration timer for sending the PTT registration message to the base station when no registration acceptance message is received from the base station and the timing registration timer is not activated; and
- a timing registration tinier for sending the PTT registration message to the base station when no registration acceptance message is received from the base station and the timing registration timer has been activated.

17. The terminal PTT registration system based on CDMA trunking system according to claim 16, wherein the transmission channel for transmitting the PTT registration message is a control channel.

18. The terminal PTT registration system based on CDMA trunking system according to claim 16, wherein the response message comprises a registration acceptance message representing that the dispatching server accepts the PTT registration message and a registration refusal message representing that the dispatching server refuses the PTT registration message.

19. The terminal PTT registration system based on CDMA trunking system according to claim 18, wherein the registration device comprises:
- a registration message processing module for generating and sending the PTT registration message and answering the response message from the base station;
- a registration tinier for periodically re-sending the PTT registration message to the base station when no registration acceptance message is received from the base station; and
- a registration message counter for recording how many times that the registration message processing module sends the PTT registration message.

* * * * *

UNITED STATES PATENT AND TRADEMARK OFFICE
CERTIFICATE OF CORRECTION

PATENT NO.         : 8,331,973 B2
APPLICATION NO.    : 12/671507
DATED              : December 11, 2012
INVENTOR(S)        : Chuanxi Wu It is certified that error appears in the above-identified patent and that said Letters Patent is hereby corrected as shown below:

In the Claims:

Col. 13, line 52, Claim 3, please delete "served" and insert --server--.

Signed and Sealed this
Tenth Day of September, 2013

Teresa Stanek Rea
*Acting Director of the United States Patent and Trademark Office*